United States Patent Office 3,453,623
Patented July 1, 1969

3,453,623
PHASE-OPTIMIZED ANTENNAE SYSTEM
William Thomas Blackband and David Edgar Thomas Nichols, Farnborough, England, assignors to Minister of Technology in Her Britannic Majesty's Government of the United Kingdom of Great Britain and Northern Ireland, London, England
Filed July 5, 1967, Ser. No. 651,217
Claims priority, application Great Britain, July 6, 1966, 30,290/66
Int. Cl. H04b 7/00
U.S. Cl. 343—100                           16 Claims

ABSTRACT OF THE DISCLOSURE

Apparatus for interconnecting two aerials having uneven polar sensitivity characteristics so that the combination of the apparatus and the aerials can achieve the effect of a single aerial having a more uniform polar sensitivity characteristic; which includes two separate signal paths for connection one to each aerial, electrically-controllable phase modulation means for causing a relative phase shift between signals in the two signal paths, a junction device connecting the two signal paths to a common signal path, a phase-sensitive detector, and perturbation means for applying an alternating perturbation signal to the phase-sensitive detector and to the phase-modulation means to cause a perturbation of the relative phase shift; and wherein the phase-sensitive detector has a signal input arranged to receive signals at the frequency of the perturbation signal from the common signal path, and also has one or more outputs arranged to control the phase-modulation means so as to bring the signals in the two signal paths into phase with each other.

---

The present invention relates to radio apparatus, and in particular to radio communication apparatus for use on aircraft, vehicles or other mobile craft.

For aerodynamic and structural reasons, it is difficult to provide an aircraft with a single aerial of omnidirectional sensitivity. It is usually possible to provide two aerials such that either one or the other of the two aerials will be capable of satisfactory transmission or reception in any arbitrarily chosen direction; but if such a pair of aerials are simply connected together, the signals from the aerials are liable to interfere with each other so that the combination has a highly irregular and undesirable polar sensitivity characteristic.

It is an object of the present invention to provide radio communication apparatus for interconnecting two aerials on an aircraft in such a way that the effect of a single aerial of omnidirectional sensitivity may be substantially achieved.

According to the present invention there is provided radio apparatus for interconnecting two aerials having uneven polar sensitivity characteristics; the apparatus including two separate signal paths for connection one to each aerial, electrically-controllable phase shifter means for causing a relative phase shift between signals in the two signal paths, junction means connecting the two signal paths to a common signal path, a phase-sensitive detector, and perturbation means for applying an alternating perturbation signal or signals to the phase-sensitive detector and to the phase-shifter means to cause a perturbation of the relative phase shift; and wherein the phase-sensitive detector is arranged to receive signals at the frequency of the perturbation signal from the common signal path, and also to apply one or more phase shift control signals to the phase shifter means so as to tend to bring the signals in the two signal paths into phase with each other at the junction means.

Embodiments of the invention will now be described, by way of example only, with reference to the accompanying drawings, of which.

Figure 1:
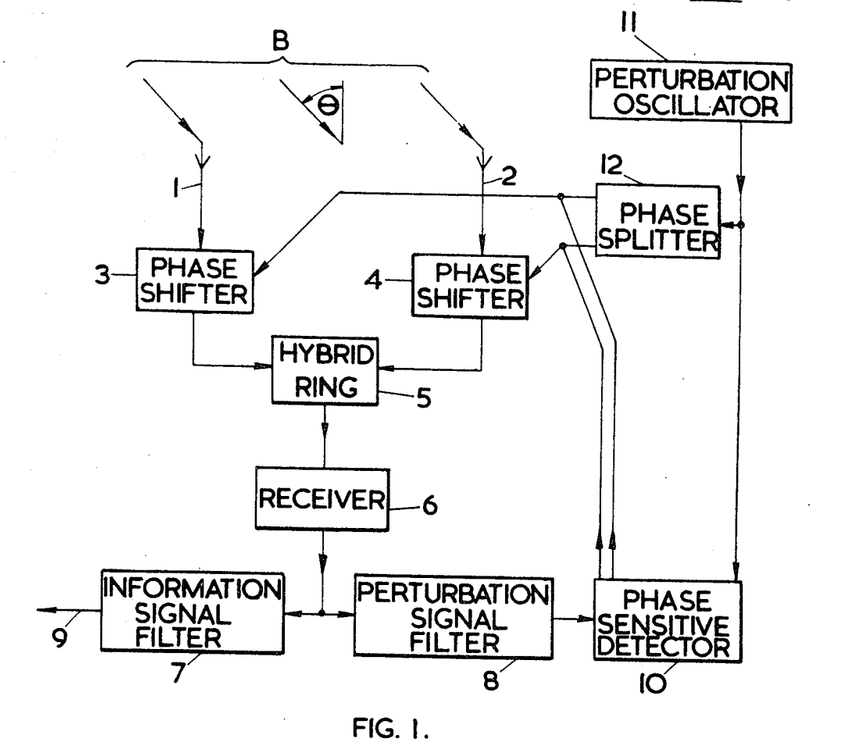
FIGURE 1 is a schematic circuit diagram of a radio communication apparatus.

FIGURE 1 shows aerials 1 and 2 which are connected through phase shifters 3 and 4 respectively to the inputs of a conventional hybrid ring 5. The sum output from the hybrid ring 5 is connected to the input of a receiver 6. The output of the receiver 6 is applied to an information signal filter 7 and to a perturbation signal filter 8. The output of the information signal filter 7 is connected to an output line 9, whereas the output of the perturbation signal filter 8 is connected to a phase sensitive detector 10.

A perturbation oscillator 11 has an output connected to the phase-sensitive detector 10 and to a phase splitter 12. D.C. push-pull outputs from the phase-sensitive detector 10 are additively combined with the push-pull outputs from the phase splitter 12 and are connected to drive the phase shifters 3 and 4 in opposite senses. A beam B of radio signals is shown diagrammatically arriving at the aerials 1 and 2.

The operation of the apparatus of FIGURE 1 will now be described. It will be assumed that the radio signals arriving at the aerials 1 and 2 form a parallel beam from a distant source. The radio signal incident on a point midway between the aerials 1 and 2 will be represented as $E \cos \omega t$. It is easily deduced that the voltages developed on the aerials 1 and 2 will then be $E \cos[\omega t - \phi_1(\theta)]$ and $E \cos[\omega t + \phi_1(\theta)]$ where $\phi_1(\theta)$ is a phase difference which depends in a known manner on inter alia the distance between the aerials and the angle of incidence ($\theta$) of the radio beam. The phase shifters 3 and 4 are arranged to produce equal and opposite phase shifts, of magnitude regulated by the combined outputs of the phase sensitive detector 10 and the phase splitter 12. These phase shifts will be represented as $+\phi_2(p)+\phi_3(t)$ and $-\phi_2(p)-\phi_3(t)$ respectively, in which expression $\phi_2(p)$ is a function of the output ($p$) of the phase sensitive detector 10 and $\phi_3(t)$ is a function of the output of the perturbation oscillator 11.

Thus the output of the phase shifter 3 will be $$E \cos [\omega t - \phi_1(\theta) + \phi_2(p) + \phi_3(t)]$$

whereas the output of the phase shifter 4 will be $$E \cos [\omega t + \phi_1(\theta) - \phi_2(p) - \phi_3(t)]$$

When these outputs are combined in the hybrid ring 5, they form a sum signal of amplitude proportional to $$2E \cos [\omega t] \cos [\phi_2(p) + \phi_3(t) - \phi_1(\theta)]$$

From this sum signal, the perturbation signal filter 8 provides an output proportional to the term $$\cos [\phi_2(p) + \phi_3(t) - \phi_1(\theta)]$$

which is applied to one input of the phase sensitive detector 10. A signal $A\phi_3(t)$, provided by the perturbation oscillator 11, is applied to the other input of the phase sensitive detector 10. In practice the function $\phi_3(t)$ is sinusoidal and may be represented as $\sin \omega_0 t$, where $\omega_0$ is an angular frequency different from the angular frequency $\omega$ of the incoming radio signal. A is a constant.

The signal $\cos [\phi_2(p) + \phi_3(t) - \phi_1(\theta)]$ has a minimum at each positive peak of the function $\phi_3(t)$. The phase sensitive detector 10 in effect samples the height of each such minimum, and its output is related to the sign and magnitude of the difference $\phi_2(p) - \phi_1(\theta)$, in such a way that it forms a servo signal to drive the system towards the condition $\phi_2(p) = \phi_1(\theta)$. In the embodiment of FIGURE 1, the phase sensitive detector 10 in fact provides two outputs in push-pull which control the phase shifters 3 and 4 respectively, in such a way that the height of the sampled minima of the signal $\cos [\phi_2(p) + \phi_3(t) - \phi_1(\theta)]$ is brought to a minimum. The effect of this is to maximise the sum output of the additive combiner 5, and hence it maximises the amplitude of the information signal passing through the filter 7 to the output 9. To operate effectively the servo loop must have a high gain with respect to the perturbation signal, and a narrow bandwidth. In practice it is advisable to make the bandwidth of the perturbation signal filter 8 approximately one percent of the bandwidth of the receiver 6.

If the settings of the phase shifters 3 and 4 are held constant, the polar sensitivity characteristic of the apparatus will be similar to that of a simple combination of the two aerials simply interconnected with lobes caused by interference between the signals from the two aerials. Relative changes in the settings of the phase shifters 3 and 4 will cause a rotation of the lobes. When the settings of the phase shifters 3 and 4 are servo-controlled by the output of the phase-sensitive detector 10 as hereinbefore described, the reception of a signal will tend to adjust the relative phase shifts produced by the shifters 3 and 4 until a lobe of maximum sensitivity is aligned with the direction of incidence of the received signal. Thus the system gives the effect of a polar sensitivity characteristic which is the envelope of the characteristics obtained by disconnecting the servo control and making incremental adjustments of the relative phase shifts in the shifters 3 and 4. This envelope is free from gross irregularities, and if the aerials 1 and 2 are suitably chosen it provides a substantially omnidirectional sensitivity. The system can also be used to send out an answering signal. The answering signal may be applied to the "sum" connection of the hybrid ring 5. It will then divide into equal signals which pass through the phase shifters 3 and 4 respectively and are transmitted from the aerials 1 and 2 in such a phase relationship that they interfere additively giving an augmented signal in the direction of the original source. It must, of course, be arranged that the settings of the phase shifters are held constant for the duration of the answering signal.

Figure 2:
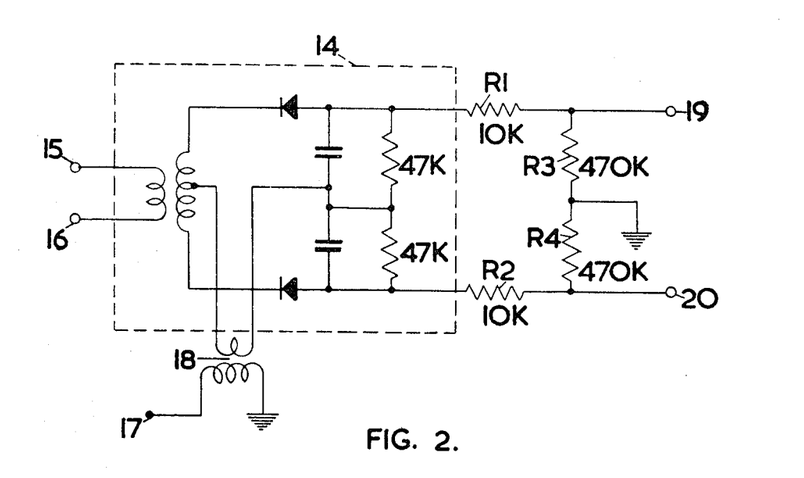
FIGURE 2 is a circuit diagram of a phase sensitive detector which forms a part of the apparatus of FIGURE 1.

FIGURE 2 shows the phase sensitive detector 10 (of FIGURE 1) in greater detail. It comprises a conventional Foster-Seeley discriminator circuit 14. Input terminals 15 and 16 are shown which in the complete apparatus are connected across the output of the perturbation signal filter 8. Another input terminal 17, which in operation is connected to the output of the perturbation oscillator 11 (FIGURE 1), is connected to the discriminator circuit 14 by means of a transformer 18. The outputs of the discriminator circuit 14 are connected by resistors R1 and R2 to output terminals 19 and 20 respectively. Two equal resistors R3 and R4 are connected in series across the terminals 19 and 20, and their junction is grounded. This arrangement of the resistors R1, R2, R3 and R4 provides a D.C. push-pull output evenly balanced about ground potential.

Figure 3:
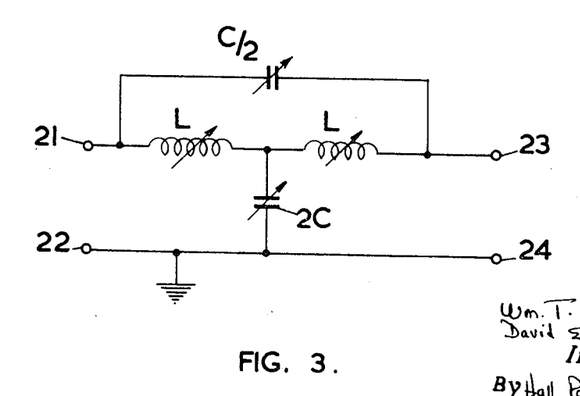
FIGURE 3 is a circuit diagram of a phase-shifting network on which the phase shifters of the apparatus of FIGURE 1 are based.

FIGURE 3 shows a variable phase-shifting network having input terminals 21, 22 and output terminals 23, 24. The network is of the bridge-T type, having two variable inductances L connected in series between the terminals 21 and 23, a variable shunt capacitance 2C connected between the junction of the two inductances L and the terminals 22 and 24, and a variable capacitance C/2 connected across the terminals 21 and 23.

The phase shifters 3 and 4 of FIGURE 1 incorporate electronically controllable phase shifting networks which are based on the network of FIGURE 3. In these networks all the inductances and capacitances are provided by arrangements of varactor diodes, and can be varied in unison by adjusting the direct currents passing through the varactor diodes. The capacitance C/2 is provided by two varactor diodes connected in series, and the capacitance 2C by two varactor diodes in parallel. Each of the inductances L is basically a quarter-wave line terminated by a varactor diode. However, both ends of each of the inductances L in FIGURE 3 must be insulated from ground at radio frequencies, so that the use of a coaxial quarter-wave line would be inconvenient and have no particular advantages; therefore a twin-wire line is used. The twin-wire line is enclosed within a grounded screen, to avoid effects due to interference and interaction; this leads to further complications which are overcome by the arrangement of FIGURE 4 as will now be described.

Figure 4:
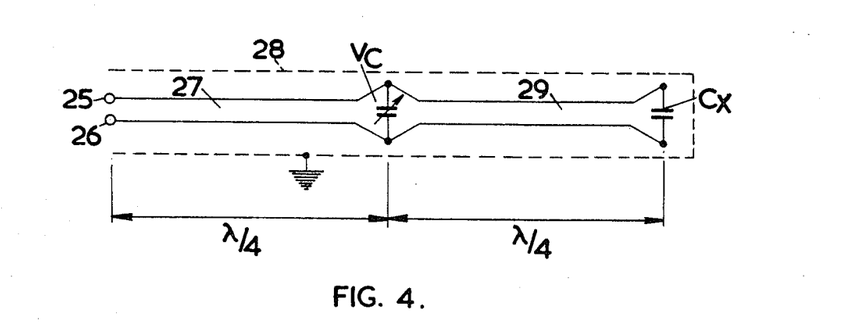
FIGURE 4 is a circuit diagram of a form of variable inductance used in the phase shifters of the apparatus of FIGURE 1.

FIGURE 4 shows terminals 25, 26 respectively connected at one end of the two conductors of a quarter wave length twin-wire transmission line 27. A variable capacitance VC, which is practice is provided in the form of a varactor diode, is connected across the conductors at the end of the transmission line 27 remote from the terminals 25, 26. A further quarter-wave length of twin-wire transmission line 29 is connected across the variable capacitance VC at one end and across a comparatively large fixed capacitance CX at its other end. A grounded screen 28, surrounds the assembly comprising the lines 27 and 29 and the capacitances VC and CX.

In accordance with well-known theory, the quarter-wave length of line 27 transforms the effect of the variable capacitance VC so that it presents the effect of a variable inductance across the terminals 25 and 26. The complications arise because if the screen 28 is made compact and efficient, then it is impossible to prevent each of the conductors of the line 27 co-operating with the screen 28 as an unwanted transmission line. If the transmission lines so formed were left open-circuited at the end beside the varactor diode variable capacitance VC, they would, being a quarter-wave long, present the effect of short-circuits grounding the terminals 25 and 26 at radio frequencies. The solution adopted and shown in FIGURE 4 is that the unwanted lines are extended for a further quarter-wave (by the line 29) and then left open-circuit. The capacitance CX, which acts as a short-circuit at radio frequencies, is then provided so that the line 29 does not short-circuit the variable capacitance VC, but merely presents the effect of a high impedance in parallel with it.

In the complete apparatus it is desirable to match the phase-shift networks to the standard 50-ohm impedance of the aerial and receiver connections, but the only conveniently available twin-wire transmission line has an impedance of 90 ohms. The line 27 of FIGURE 4 is therefore in the practical embodiment replaced by two separate 90 ohm twin-wire lines connected in parallel, as shown in FIGURE 5.

Figure 5:
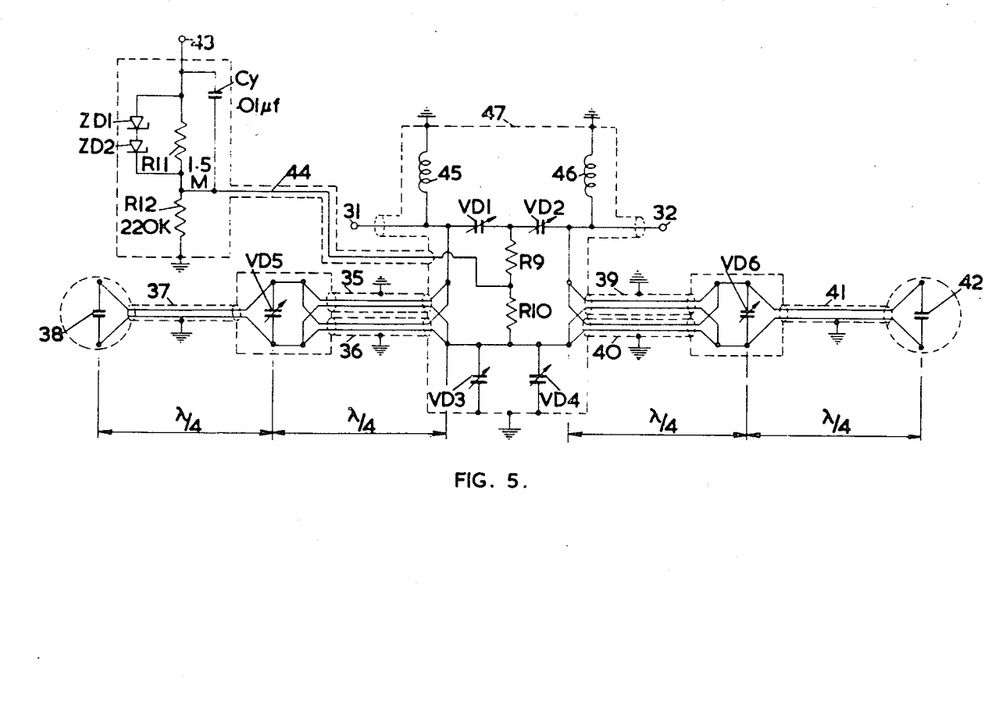
FIGURE 5 is a circuit diagram of a phase shifter as used in the apparatus of FIGURE 1.

In FIGURE 5, the variable phase-shift network and the network through which the phase shift control signals are applied to it are shown in detail. The phase-shift network has a coaxial radio frequency input connector 31 and a coaxial radio frequency output connector 32. Two varactor diodes VD1 and VD2 are connected in series between the inner conductor of the input connector 31 and the inner conductor of the output connector 32; these correspond to the variable capacitance C/2 connected between the terminals 21 and 23 on FIGURE 3. Two varactor diodes VD3 and VD4 are connected in parallel with one side grounded; they correspond to the variable capacitance 2C of FIGURE 3. Corresponding to the inductance L on the left hand side of FIGURE 3, there is an arrangement similar to that of FIGURE 4, including two twin-wire transmission lines 35 and 36 whose conductors are connected in parallel, one wire of each twin-wire transmission line being connected to the inner conductor of the connector 31 and the other being connected to the side of the diodes VD3 and VD4 remote from ground. The twin-wire transmission lines 35 and 36 are each a quarter-wave length long and they are separately screened. Another varactor diode VD5 is connected across the ends of the twin-wire transmission lines 35 and 36 remote from the connector 31 and the varactor diodes VD3 and VD4. Another quarter-wave length of screened twin-wire transmission line 37 has one end connected across a fixed capacitor 38 and its other end connected across the varactor diode VD5. An exactly similar arrangement incorporating twin-wire lines 39, 40 and 41, a varactor diode VD6 and a fixed capacitance 42, is connected between the inner conductor of the connector 32 and the side of the varactor diodes VD3 and VD4 remote from ground. This arrangement corresponds to the inductance L on the right-hand side of FIGURE 3. The whole phase-shift network is enclosed within a grounded screen 47 which incorporates the screens of the twin-wire transmission lines.

A control signal input terminal 43 is connected to the phase-shift network through a linearity correction network and a screened cable 44. The inner conductor of the cable 44 is connected by a resistor R9 to the junction of the varactor diodes VD1 and VD2 and by a resistor R10 to the side of the varactor diodes VD3 and VD4 remote from ground. Radio frequency chokes 45 and 46 are connected between ground and the inner conductors of the connectors 31 and 32 respectively, to provide direct current paths for the currents of the varactor diodes VD1, VD2, VD5 and VD6.

The linearity correction network includes a potential divider comprising resistors R11 and R12 connected in series between the control signal input terminal 43 and ground. The resistor R11 is shunted by a capacitor CY and by two Zener diodes ZD1 and ZD2 in series. The junction of the resistors R11 and R12 is connected to the inner conductor of the screened cable 44.

To ensure that sufficient phase-shift can be achieved, each of the phase shifters 3 and 4 in the complete apparatus (FIGURE 1) actually contains two networks as shown in FIGURE 5, their radio frequency paths being connected in series and their control signal input inputs being connected together.

One output of the phase splitter 12 and the output terminal 19 of the phase sensitive detector 10 (FIGURE 2) are connected to the control signal input terminal 43 of each of the phase shifting networks in the phase shifter 3 (FIGURE 1) whereas the other output of the phase splitter 12 and the output 20 of the phase sensitive detector 10 (FIGURE 2) are connected to the control signal input terminal 43 of each of the phase-shift networks in the phase shifter 4.

In operation, the effective capacitance of the varactor diodes in each phase-shift network varies in a well-known manner according to the magnitude of the direct currents passed through them. These currents are controlled by the voltage applied to the control signal input terminal 43, which has a superimposed ripple at the perturbation frequency. The linearity correction network is provided to compensate for the non-linearity of the relationship between the direct current in each varactor diode and its effective capacitance. The Zener diodes ZD1 and ZD2 are selected to achieve a sufficiently accurate compensation. This is important, as the non-linearity would if it were inadequately compensated tend to make the loop gain of the system vary widely with different settings of the phase shift $\phi_2(p)$. This could cause instability or unsatisfactory operation at some settings. The capacitor CY compensates for the effects of the stray capacitance of the cable 44 on the performance of the potential divider formed by R11 and R12.

The apparatus of FIGURE 1 has the disadvantage that its servo action makes gradual and cumulative adjustments of the phase shift which occasionally accumulate until the phase shifts demanded of the phase shifters 3 and 4 becomes excessive (outside the preferred operating range of the phase shifters). This can introduce undesirable non-linearity into the servo loop, and may prevent it operating. The difficulty can be overcome by a simple addition to the apparatus, which is shown in FIGURE 6.

Figure 6:
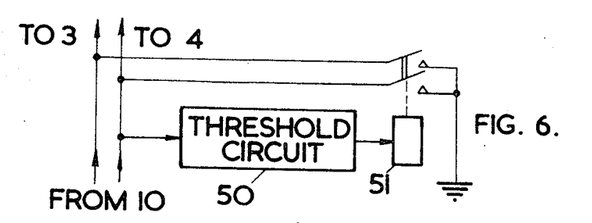
FIGURE 6 is a schematic circuit diagram of a modification which may be added to the apparatus of FIGURE 1.

FIGURE 6 shows part of the lines connecting the outputs of the phase-sensitive detector 10 to the control signal inputs of the phase shifters 3 and 4 of FIGURE 1. One of these lines is connected to the input of a threshold circuit 50. The output of the threshold circuit 50 is arranged to control a relay 51. Normally-open contacts of the relay 51 are arranged to connect the control signal inputs to ground when the relay is operated. It is arranged that the threshold circuit 50 will operate the relay 51 whenever the demanded phase shifts become excessive. This temporarily reduces the applied relative phase shift to zero, and then allows the servo system to restart. In effect, this switches the system to operate on a different lobe, in fact on the lobe requiring least phase shift to bring it into the required direction.

Various other modifications are possible. For instance, an alternative form of additive combining device might be used in place of the hybrid ring 5. While it is necessary that the perturbations of phase $+\phi_3(t)$ and $-\phi_3(t)$ should be substantially equal and opposite, it is not essential to use equal and opposite phase shifts $+\phi_2(p)$ and $-\phi_2(p)$. Hence the phase sensitive detector 10 need not have an evenly balanced push-pull output; it may have a single output arranged to control the relative phase shift by adjusting one phase shifter only. The use of a balanced push-pull output producing equal and opposite phase shifts does however have the advantages of reducing any tendency to drift and thereby improves the stability and accuracy of the system.

It is desirable to include a non-linear element in the servo loop so that its response is comparatively rapid when the error signal is large and a comparatively large adjustment is required, but slows down as a condition of optimum adjustment is approached and the error signal decreases. This gives a desirably quick response together with comparative freedom from hunting.

The type of discriminator circuit hereinbefore described with reference to FIGURE 2 must be carefully designed to avoid excessive drift, and when this type of discriminator is used the perturbation oscillator must be tuned to suit it. In an alternative arrangement, the perturbation oscillator is arranged to produce square waves and a transistor switching circuit is used as a phase sensitive detector. The transistor switching circuit may include a pair of gates controlled by a square wave output from the perturbation oscillator and fed with push-pull signals from a phase splitter circuit driven from the output of the filter 8. Rectifying or smoothing circuits connected to the outputs of the gates are then used to produce the phase shift control signals, on which small signals from the perturbation oscillator are superimposed as hereinbefore described.

Phase-shifting networks of the sort hereinbefore described with reference to FIGURE 5 have a power-handling capability which is limited by the capabilities of available varactor diodes. At high power levels frequency multiplication effects in the varactor diodes tend to transform a considerable part of the radio-frequency signal power into unwanted harmonics of the radio frequency signal. It may therefore in some cases be desirable to use an alternative form of phase-shifting apparatus, especially in applications where it is desired to send a high-power answering signal. A suitable alternative arrangement includes a set of delay lines of different lengths which are switched in or out of the signal path by electronically-controlled switches, thus providing increments of phase shift. The electronically-controlled switches may be p-i-n diodes controlled via a logical circuit by a digitised form of the output of the phase sensitive detector.

Figure 7:
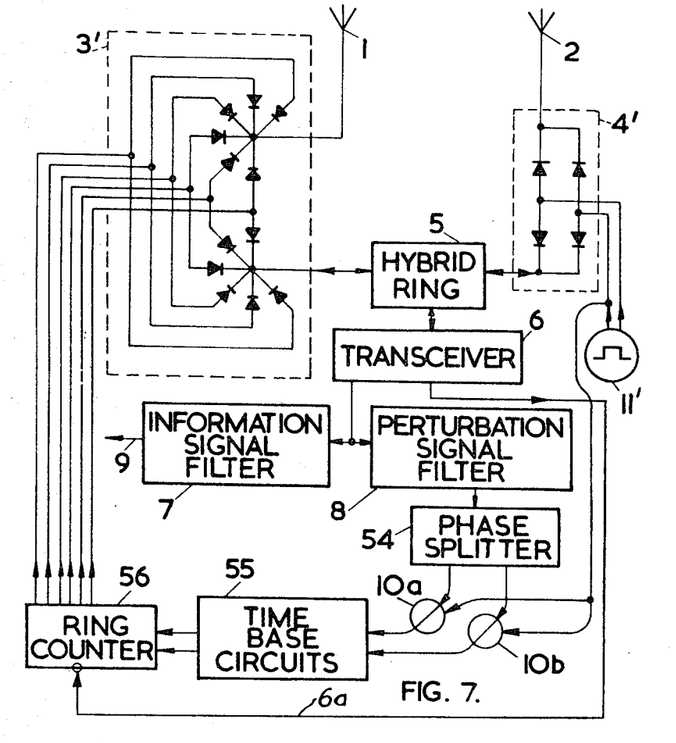
FIGURE 7 is a schematic circuit diagram of an alternative form of radio communications apparatus.

FIGURE 7 shows a radio receiving and transmitting apparatus incorporating several of the modifications hereinbefore mentioned. Components in FIGURE 7 are given references identical or similar to the references of corresponding components in FIGURE 1.

In FIGURE 7 aerials 1 and 2 connected through phase shifters 3' and 4' respectively to a hybrid ring 5. The sum output of the hybrid ring 5 is connected to a transmitter/receiver (or transceiver) apparatus 6. The received signals output of the transceiver 6 is connected through a filter 7 to an output 9 and through another filter 8 to a phase splitter 54. Push-pull outputs of the phase splitter are connected through gates 10a and 10b respectively to a pair of time base circuits 55. Outputs from the circuits 55 are connected to drive a ring counter circuit 56.

The phase shifter 3' comprises a set of coaxial lines connected in parallel. Each coaxial line includes two p-i-n diodes connected in series back-to-back. The coaxial lines are of different lengths, and separate direct current connections are made from their central portions to outputs of the ring counter 56 so that a monotonic count in the ring counter 56 will render conductive (one at a time) coaxial lines of successively increasing lengths.

The phase shifter 4' comprises a pair of coaxial lines connected in parallel, each including two p-i-n diodes connected in series back-to-back and having separate direct current connections from their central portions to complementary outputs of a free-running multivibrator 11'. The coaxial lines of the phase shifter 4' differ in length by an amount which corresponds to a phase shift of approximately six degrees at the carrier frequency of the signals which the aerials 1 and 2 are intended to receive and transmit. One output of the multivibrator 11' is also connected to control the gates 10a and 10b.

The time base circuits 55 are of the type which will produce a sawtooth waveform with a fast flyback and a ramp duration controlled by an analogue input signal, and in which the analogue input signal determines the rate of charge flow into or out of a capacitor, and a flyback is initiated when the voltage across the capacitor reaches a predetermined threshold. Thus the ramp duration is related to the input signal according to an exponential charging or discharging function. In the present apparatus, pulses derived from the flyback signals are used to drive the ring counter circuit 56. The input stages of the time base circuits 55 are arranged to act as simple clipping circuits which will not respond to input signals of less than a preset threshold voltage. The ring counter 56 includes three bistable circuits connected to a plurality of outputs by a diode matrix.

When the apparatus of FIGURE 7 is receiving radio signals through the aerials 1 and 2, the coaxial lines of the phase shifter 4' are switched in to the reception path from the aerial 2 alternately. This generally produces a square-wave amplitude modulation of the received signals, since it corresponds to an incremental reciprocating rotation of the sensitivity pattern of the apparatus. For example, suppose that a condition of greater sensitivity is achieved during the half-cycles in which the longer of the two lines in the phase shifter 4' is conductive. This gives an output from the filter 8 which is in phase with the signal controlling the gates 10a and 10b. Hence the gate 10a conducts and feeds current into one of the time base circuits 55 until it generates a flyback pulse. The flyback pulse from this time base circuit initiates a forward count in the ring counter 56, which energises a different one of its outputs, and thereby switches a shorter coaxial line of the phase shifter 3' in to the reception path from the aerial 1 unless the line previously in use was the shortest one, in which case the forward count switches in the longest of the lines. This changes the relative phase shift applied to the signals from the two aerials 1 and 2, and in effect rotates the polar sensitivity pattern of the apparatus to turn a direction of greater sensitivity towards the direction of incidence of the received signal.

When the received signal comes from such a direction that the sensitivity of the apparatus is greater when the shorter of the lines in the phase shifter 4' is in use, the output of the filter 8 is in antiphase with the signal controlling the gates 10a and 10b. The inverted form of the signal produced by the phase splitter 54 then passes through the gate 10b and feeds current into the other of the time base circuits 55 until it produces a flyback pulse. The flyback pulse from this other time base circuit initiates a reverse count in the ring counter 56, which switches a longer coaxial line of the phase shifter 3' into the reception path from the aerial 1, unless the line previously in use was the longest one, in which case the reverse count switches in the shortest of the lines. This also turns a direction of greater sensitivity towards the direction of incidence of the received signal. Thus the apparatus of FIGURE 7 acts as a servo system which moves in discrete steps, while the apparatus of FIGURE 1 provides a continuously variable adjustment. The coaxial lines of the phase shifter 3' should be arranged to allow the introduction of various phase shifts equally spaced over a range of 360 degrees; thus if there are $n$ coaxial lines arranged as shown, the lengths of successive lines should preferably differ by $360/n$ degrees.

The amplitude of the square wave signal at the output of the filter 8 depends on the difference in the sensitivities occurring in two azimuthal directions six degrees apart. Where the direction of incidence of the received signals intersects the side of a lobe in the sensitivity pattern appropriate to the instantaneous condition of the apparatus, the amplitude of the filter output is comparatively large and it very quickly drives the capacitor of the appropriate time base circuit to the voltage which initiates a flyback pulse and a stepping action of the counter 56. However when the direction of incidence of the received signal is closer to the peak of a lobe in the pattern, the amplitude of the filter output is reduced and it takes longer to build up the voltage needed to initiate the flyback pulse. The time taken to build up the voltage for a flyback pulse is related to the amplitude of the filter output signal according to an exponential capacitor charging function. This has the desirable result that it provides a variable-rate servo system whose response is comparatively rapid when the error signal is large and a comparatively large adjustment is required, but which slows down as a condition of optimum adjustment is approached. This gives a desirably quick response together with comparative freedom from hunting.

The threshold adjustment connected to the input stages of the time base circuits 55 is adjusted so that filter output signals of small amplitude, such as might occur when the direction of incidence of the received signal differs from a direction of maximum sensitivity by less than half the incremental rotation corresponding to one step of the servo, will only occasionally build up enough voltage to cause a stepping action. It also prevents the servo system from responding to any noise voltages.

Figure 8:
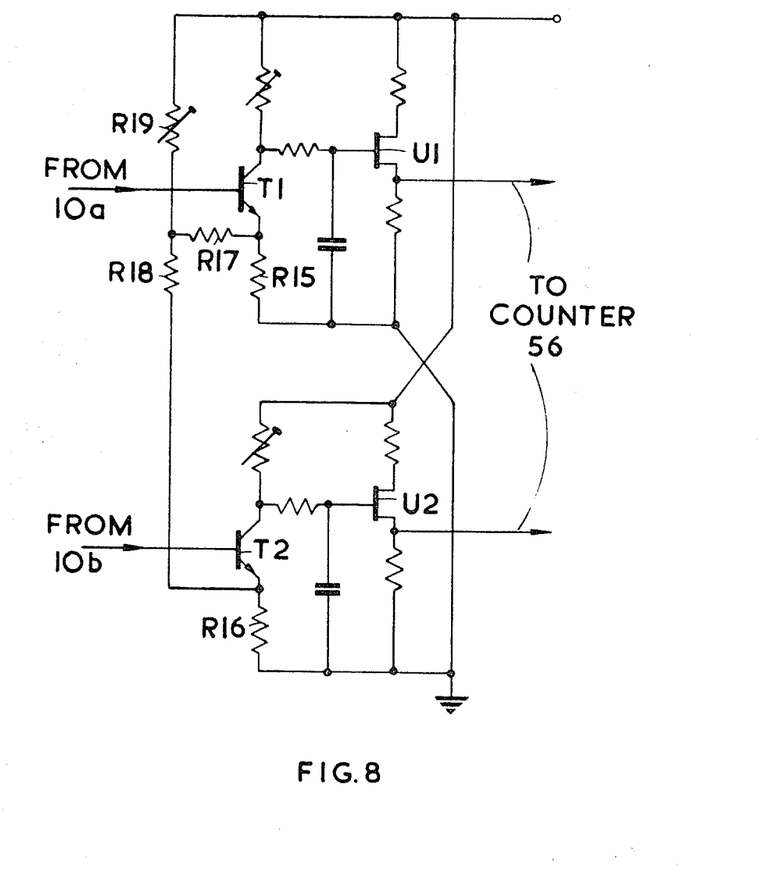
FIGURE 8 is a circuit diagram of time base circuits used in the apparatus of FIGURE 7.

FIGURE 8 shows the time base circuits 55 in greater detail. They comprise a pair of circuits of a kind which is known per se with the addition of a resistor chain to provide an adjustable threshold effect. Each circuit includes an npn transistor (T1 and T2 respectively) and a unijunction transistor (U1 and U2 respectively). Signals from the outputs of the gates 10a and 10b of FIGURE 7 are connected to the bases of the transistors T1 and T2 respectively. The emitter connections of the transistors T1 and T2 include resistors R15 and R16 respectively. One end of a preset resistor R19 is connected to receive a power supply positive voltage. Its other end is connected by separate resistors R17, R18 to the emitters of the transistors T1 and T2. Current drawn through the resistor R19 causes a voltage drop across each of the resistors R15 and R16; the signals from the gates 10a or 10b pass the transistors T1 and T2 only when they have voltages greater than this voltage drop. Hence the preset resistor R19 can be used to set the threshold action to occur at an appropriate level.

When the apparatus of FIGURE 7 is used to transmit an answering signal, the answering signal is applied to the transceiver 6. The transceiver 6 is switched to operate in its transmitting mode and a connection 6a from it to an inhibiting input of the ring counter 56 is energised so that the counter is temporarily prevented from counting. The transceiver output signal splits in to two parts in the hybrid rings, one part going through the phase shifter 3' and the aerial 1 and the other going through the phase shifter 4' and the aerial 2.

Various further modifications of the apparatus of FIGURE 7 are possible. Although six alternative lines are shown in the phase shifter 3', any number may be used, and more than six may be desirable. For instance eight lines may be arranged to give increments of 45 degrees of phase shift. Alternatively, there may be two or more groups of lines connected in series, each group comprising at least two lines connected in parallel, arranged to be made conductive in various combinations under the control of outputs of the counter circuit 56 so as to produce a number of phase shifts equally spaced throughout 360 degrees. The gates 10a and 10b may be controlled by complementary outputs of the multivibrator 11' and the phase splitter 54 omitted.

We claim:
1. Radio apparatus comprising two aerials having uneven polar sensitivity characteristics, two signal paths connected one to each of the said two aerials, electrically-controllable phase-shifter means for causing a relative phase shift between signals in the two signal paths, receiver means connected to the said two signal paths for receiving a combination of the signals carried therein, a phase-sensitive detector connected to the receiver means, perturbation means connected to the phase-sensitive detector and to the phase-shifter means for applying at least one alternating perturbation signal thereto and thereby causing a perturbation of the relative phase shift; and wherein the phase sensitive detector is constructed and connected to receive perturbation-frequency components from the said combination of signals through the said receiver means, to derive at least one phase shift control signal dependent on the relative phase difference between the said alternating perturbation signal and the said perturbation-frequency components and to apply the said phase shift control signal to the said phase-shifter means so as to tend to bring the said signals in the two signal paths into phase with each other at the receiver means.

2. Radio apparatus as claimed in claim 1 and wherein the phase-shifter means is constructed to provide a continuously variable phase shift in response to a phase shift control signal in the form of an analogue signal representing the amount of relative phase shift required to bring the said two signals into phase with each other.

3. Radio apparatus as claimed in claim 2 and comprising restarting means connected to the outputs of the phase sensitive detectors, for temporarily connecting all the said outputs to a predetermined voltage whenever an undesirably large phase-shift control signal occurs.

4. Radio apparatus as claimed in claim 2 and wherein the phase-shifter means comprises an electronically controllable inductance in the form of a quarter-wave length of transmission line having a varactor diode connected at its further end.

5. Radio apparatus as claimed in claim 4 and wherein the transmission line is a screened line, and another similar screened quarter-wave length of transmission line is connected at one end to the varactor diode and its other end to a larger capacitance than the capacitance of the diode.

6. Radio apparatus as claimed in claim 1 and wherein the phase-shifter means comprises a first phase-shifter connected to the perturbation means to receive the perturbation signal therefrom and a second phase-shifter connected to an output of the phase-sensitive detector to receive the phase shift control signal therefrom.

7. Radio apparatus as claimed in claim 1 and wherein the phase-shifter means is constructed to provide any selected one of a plurality of predetermined relative phase shifts.

8. Radio apparatus as claimed in claim 7 and wherein the phase-shifter means comprises a plurality of transmission lines of different lengths and signal-directing means connected thereto for directing signals through at least one line selected from the said plurality of transmission lines.

9. Radio apparatus as claimed in claim 8 and wherein the signal-directing means comprises a separate combination of two unilaterally-conductive devices connected back-to-back in series with each of the said plurality of transmission lines.

10. Radio apparatus as claimed in claim 8 and comprising a reversible ring counter circuit having connections to the outputs of the phase sensitive detector and constructed to be driven by signals derived therefrom, and having outputs connected to control the signal directing means.

11. Radio apparatus as claimed in claim 10 and comprising means connected to the outputs of the phase sensitive detector for producing signals to drive the ring counter circuit at intervals whose duration is a non-linear function of the voltage at the output of the phase sensitive detector, so that the ring counter is driven comparatively rapidly when the output of the phase-sensitive detector indicates the need for a comparatively large adjustment, but is driven comparatively slowly when only a small adjustment is required.

12. Radio apparatus as claimed in claim 10 wherein the phase-sensitive detector comprises a pair of gate circuits connected to receive signals at the frequency of the perturbation signal from the receiver means, both of said gate circuits being connected to and controlled by the perturbation means, and wherein the ring counter circuit is constructed and connected to be driven forwardly by a signal derived from the output of one of the said gate circuits and to be driven backwardly by a signal derived from the output of the other of the said gate circuits.

13. Radio apparatus as claimed in claim 12 and comprising a pair of voltage-controlled time base circuits having control inputs respectively connected to the outputs of the said pair of gate circuits, and connected to drive the said ring counter circuit by signals derived from their fly-back pulses.

14. Radio apparatus as claimed in claim 13 and wherein the time base circuits are such that the time intervals between successive flyback pulses are related to the voltages applied to their control inputs according to an exponential charging function.

15. Radio apparatus as claimed in claim 14 and wherein the time base circuits are constructed to be responsive only to signals of greater than a preset threshold voltage.

16. Radio apparatus as claimed in claim 1 and comprising means for transmitting an answering signal through the phase shifter means and the two aerials, and means for holding constant the phase shift control signals while the answering signal is being transmitted.

References Cited

UNITED STATES PATENTS

| | | | |
|---|---|---|---|
| 3,036,210 | 5/1962 | Lehan et al. | 343—100 X |
| 3,251,062 | 5/1966 | Ghose | 343—100 |
| 3,295,138 | 12/1966 | Nelson | 343—100 X |

RODNEY D. BENNETT, JR., *Primary Examiner.*

T. H. TUBBESING, *Assistant Examiner.*